United States Patent [19]
Steadman

[11] Patent Number: 6,152,517
[45] Date of Patent: Nov. 28, 2000

[54] COVER ASSEMBLY

[76] Inventor: William David Steadman, 111-4800 S. East, Stuart, Fla. 34997

[21] Appl. No.: 09/230,788

[22] PCT Filed: Jul. 24, 1997

[86] PCT No.: PCT/GB97/02007

§ 371 Date: Jan. 20, 1999

§ 102(e) Date: Jan. 20, 1999

[87] PCT Pub. No.: WO98/04425

PCT Pub. Date: Feb. 5, 1998

Related U.S. Application Data

[60] Provisional application No. 60/022,390, Jul. 29, 1996.

[51] Int. Cl.$^7$ .................................................. B60J 10/10
[52] U.S. Cl. ................. 296/107.01; 296/98; 296/100.11; 296/100.18; 296/26.04
[58] Field of Search .................... 296/98, 100.11, 296/100.14, 100.15, 100.17, 100.18, 28.04, 28.06, 28.07

[56] References Cited

U.S. PATENT DOCUMENTS

| | | | |
|---|---|---|---|
| 709,330 | 9/1902 | Kilbourne | 296/98 |
| 1,770,503 | 7/1930 | Williams | 296/98 |
| 1,784,248 | 12/1930 | Nolen et al. | 296/98 |
| 3,563,594 | 2/1971 | London | 296/98 |
| 3,861,737 | 1/1975 | Kirkbride | 296/100.18 |
| 4,215,897 | 8/1980 | Aiken et al. | 296/100.11 |
| 4,717,196 | 1/1988 | Adams | 296/98 |
| 4,991,901 | 2/1991 | Meekhof et al. | 296/98 |
| 4,995,663 | 2/1991 | Weaver et al. | 296/100.11 |
| 5,078,441 | 1/1992 | Borskey | 296/26.07 |
| 5,180,203 | 1/1993 | Goudy | 296/98 |
| 5,186,231 | 2/1993 | Lewis | 296/98 |
| 5,211,440 | 5/1993 | Cramaro | 296/98 |
| 5,211,441 | 5/1993 | Barkus et al. | 296/98 |
| 5,240,303 | 8/1993 | Hageman | 296/100.14 |
| 5,466,030 | 11/1995 | Harris et al. | 296/98 |
| 5,655,807 | 8/1997 | Rosario | 296/98 |
| 5,762,393 | 6/1998 | Darmas | 296/98 |
| 5,765,901 | 6/1998 | Wilkins | 296/98 |
| 5,829,818 | 11/1998 | O'Daniel | 296/98 |
| 5,944,374 | 8/1999 | Searfoss | 296/98 |
| 6,012,759 | 1/2000 | Adamek | 296/98 |

FOREIGN PATENT DOCUMENTS

| | | |
|---|---|---|
| 0409340 | 1/1991 | European Pat. Off. . |
| 3049567 | 7/1982 | Germany . |
| 2041839 | 9/1980 | United Kingdom . |

*Primary Examiner*—Joseph D. Pape
*Assistant Examiner*—Kiran Patel
*Attorney, Agent, or Firm*—Watts Hoffmann Fisher & Heinke CO LPA

[57] ABSTRACT

A cover assembly (10) for a pick-up type of vehicle (28). The assembly comprises a frame (12) and spring urging arrangements (32) extending downwardly from the sides of the frame (12) to each side of the vehicle. A flexible cover member extends over the frame (12) and arrangements (32). The cover member (24) is selectively rollable onto or off rollers (22, 52) such that the height of the assembly (10) automatically raises or lowers as a result of the amount of cover member (24) unrolled and by virtue of the spring urging arrangements (32) maintaining the cover member (24) taut.

37 Claims, 4 Drawing Sheets

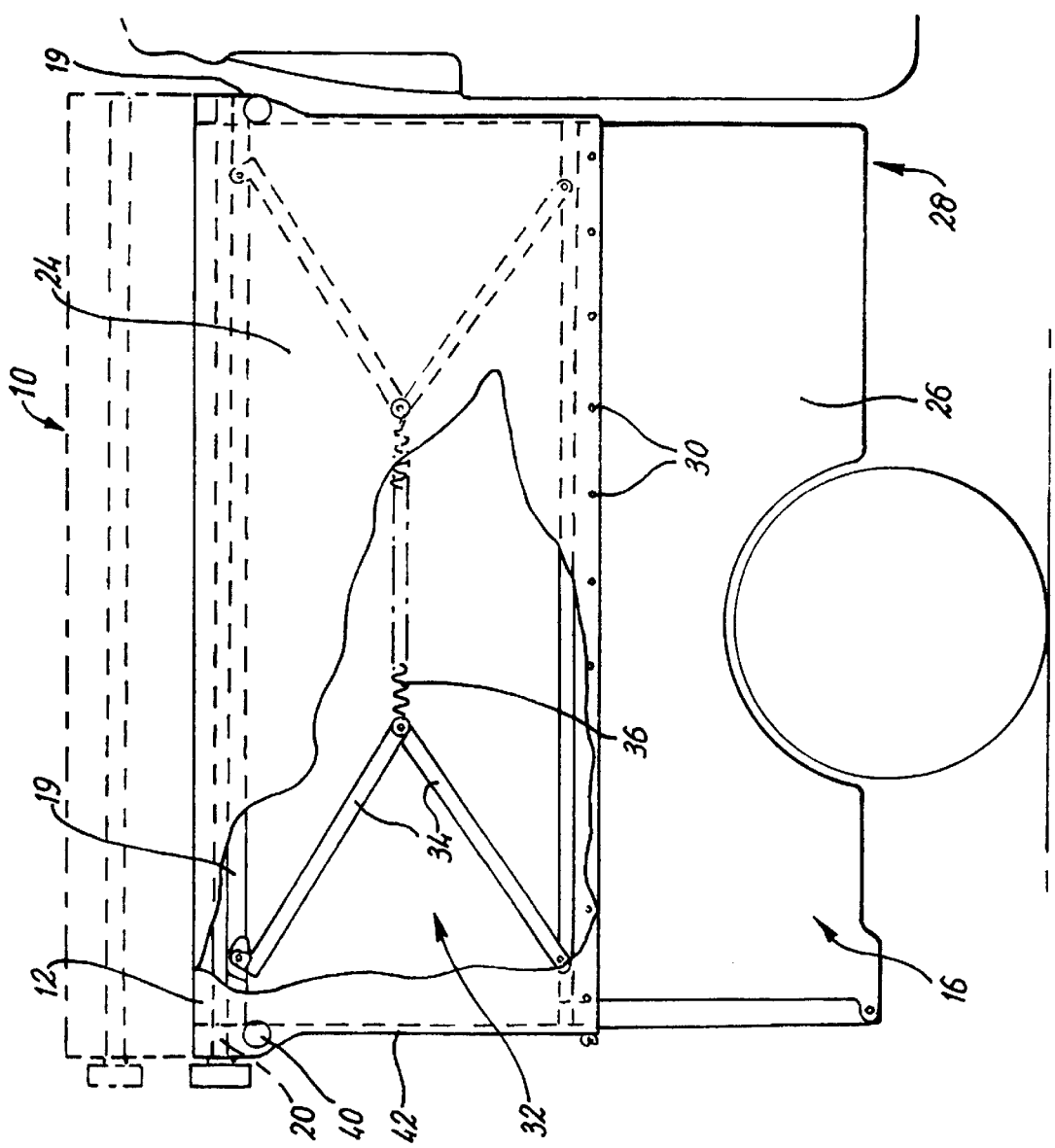
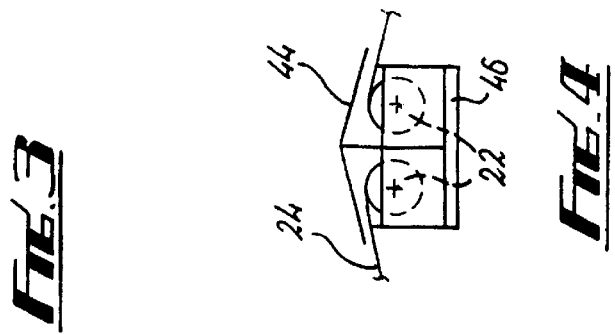

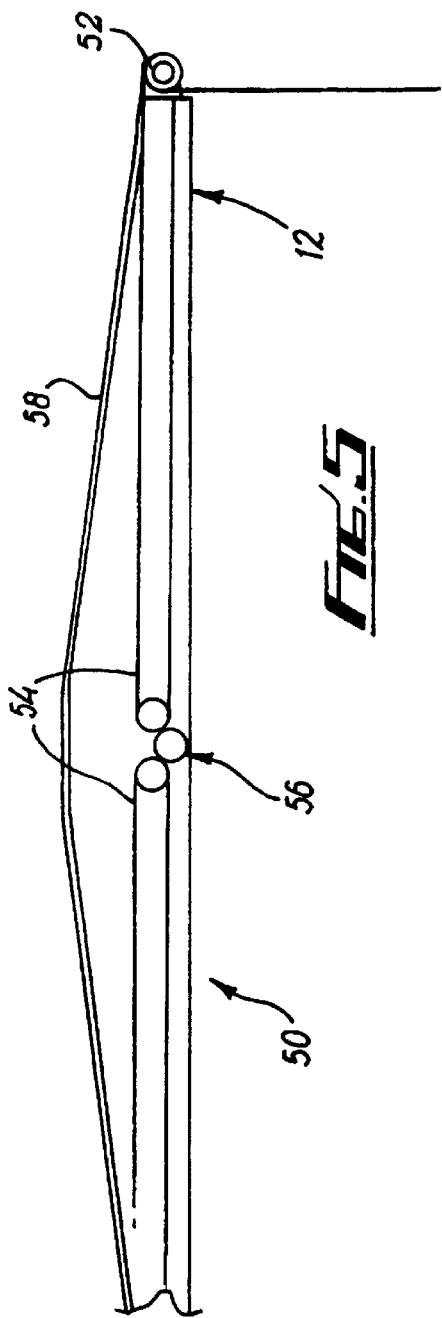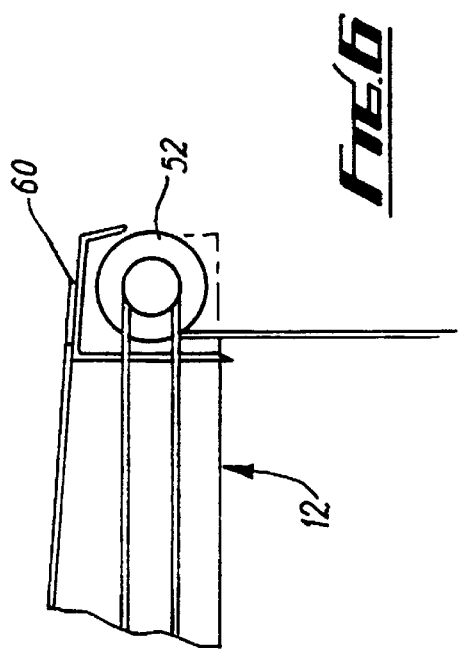

COVER ASSEMBLY

This application claims benefit to provisional application 60/022,390 filed Jul 29, 1996.

This invention concerns a cover assembly, and particularly but not exclusively a cover assembly for an open backed vehicle such as a pick-up truck.

Conventionally covers for the load carrying parts of vehicles such as pick-up trucks, comprise a sheet of material which can be fitted to the truck to extend over the load carrying area at the height of the trucks side walls. Accordingly such covers cannot be used if items are carried which extend far above the height of the side walls.

According to the present invention there is provided a cover assembly, the assembly comprising a cover member of flexible sheet material; a roller arrangement to selectively roll up a variable amount of the cover member; and profile forming means engageable with the cover member; the assembly being arranged such that the cover member can extend between two fixed members, and the amount of material extending therebetween can be varied by the roller arrangement, with the profile forming means urging the cover member away from a one of the two fixed members or another fixed member to maintain the cover member substantially taut.

The assembly may comprise two roller arrangements, desirably each with a respective cover member. Free ends of the cover members are preferably mountable to respective fixed members.

The roller arrangements are preferably arranged to dispense the respective cover members in substantially opposite directions, and the roller arrangements may be located substantially adjacent each other.

The roller arrangements are preferably interconnected so as to each simultaneously dispense or roll up the respective cover members. The roller arrangements preferably each comprise a roller with the respective rollers interconnected by gearing so as to rotate at the same rate as each other but in opposite directions.

Alternatively the roller arrangements may be spaced from each other. The roller arrangements may be interconnected by line means. The line means may comprise chains.

A fixed size cover may extend between the roller arrangements, which cover may be made of flexible sheet material or rigid material.

The roller arrangements may be manually or electrically operable.

A profile forming means is preferably provided for each cover member. Each profile forming means preferably extends from the or adjacent the, free end of the respective cover member.

Each profile forming means preferably extends between a guide member and the or adjacent the free end of the respective cover member, such that the distance between the guide members and the free end of the respective cover member is dependent upon the amount of cover member dispensed by the roller arrangement. The distance between each respective guide member and roller arrangement is preferably equal and fixed.

The assembly may comprise a frame which mounts the guide members and roller arrangements. Some or all of the components of the frame may be adjustable in length. The frame may be formable from a kit of components.

Where the roller arrangements are spaced from each other, the guide members may be located adjacent the respective roller arrangements or the roller arrangements may constitute the guide members.

The guide members may comprise one or more rollers.

The or each profile forming means is preferably sprung outwardly and may comprise two pairs of pivotted arms, with a compressed spring means extending between each pair of arms to urge the arms to a straight configuration.

The profile forming means may extend in a generally vertical plane in use. The cover members extending between the guide members and the roller arrangements may extend in use in a generally horizontal alignment, and may slope generally downwardly from the roller arrangements.

Further cover members may be provided at either end of the assembly, and the or each further cover member may extend between respective ends of the guide members. The or each further cover member may be mounted on sprung rollers which are urged to roll up the cover members, and the free end of the or each further cover member may be mountable to a fixed member.

The invention also provides a cover assembly for a vehicle, the assembly being according to any of the preceding fifteen paragraphs, with the or each roller arrangement aligned substantially longitudinally.

The invention still further provides a pick-up truck incorporating a cover assembly according to any of the preceding sixteen paragraphs.

Embodiments of the present invention will now be described by way of example only with reference to the accompanying drawings, in which:

FIG. 3 is a diagrammatic partially cut away side view of the assembly of FIG. 1;

FIG. 4 is a diagrammatic end view of a modified part of the assembly of FIG. 1;

FIG. 5 is a diagrammatic end view of a second cover assembly according to the invention; and FIG. 6 is an enlarged view of part of the assembly of FIG. 5.

Figure 1:
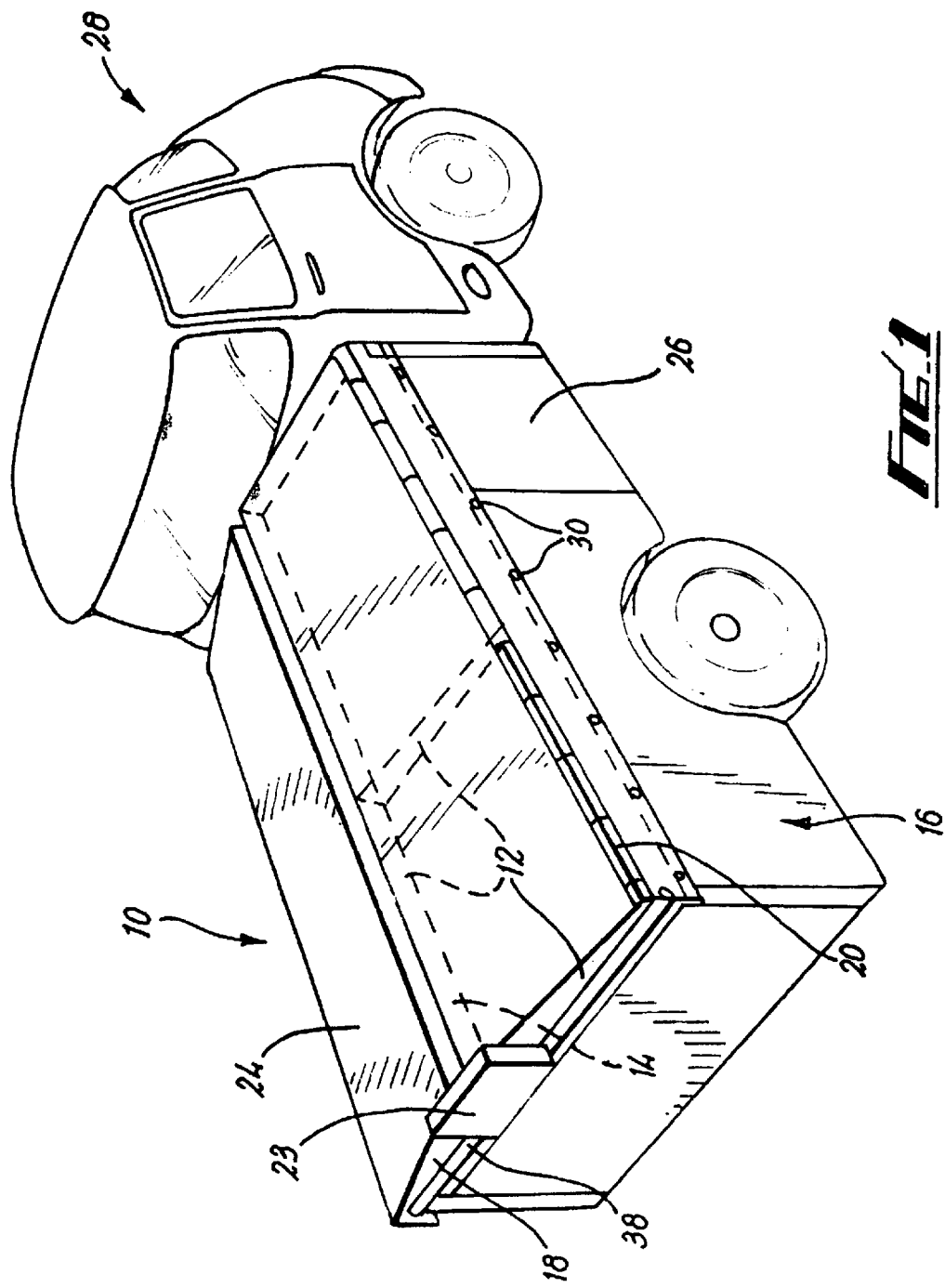
FIG. 1 is a diagrammatic perspective view of a first cover assembly according to the invention fitted on a vehicle.
Figure 2:
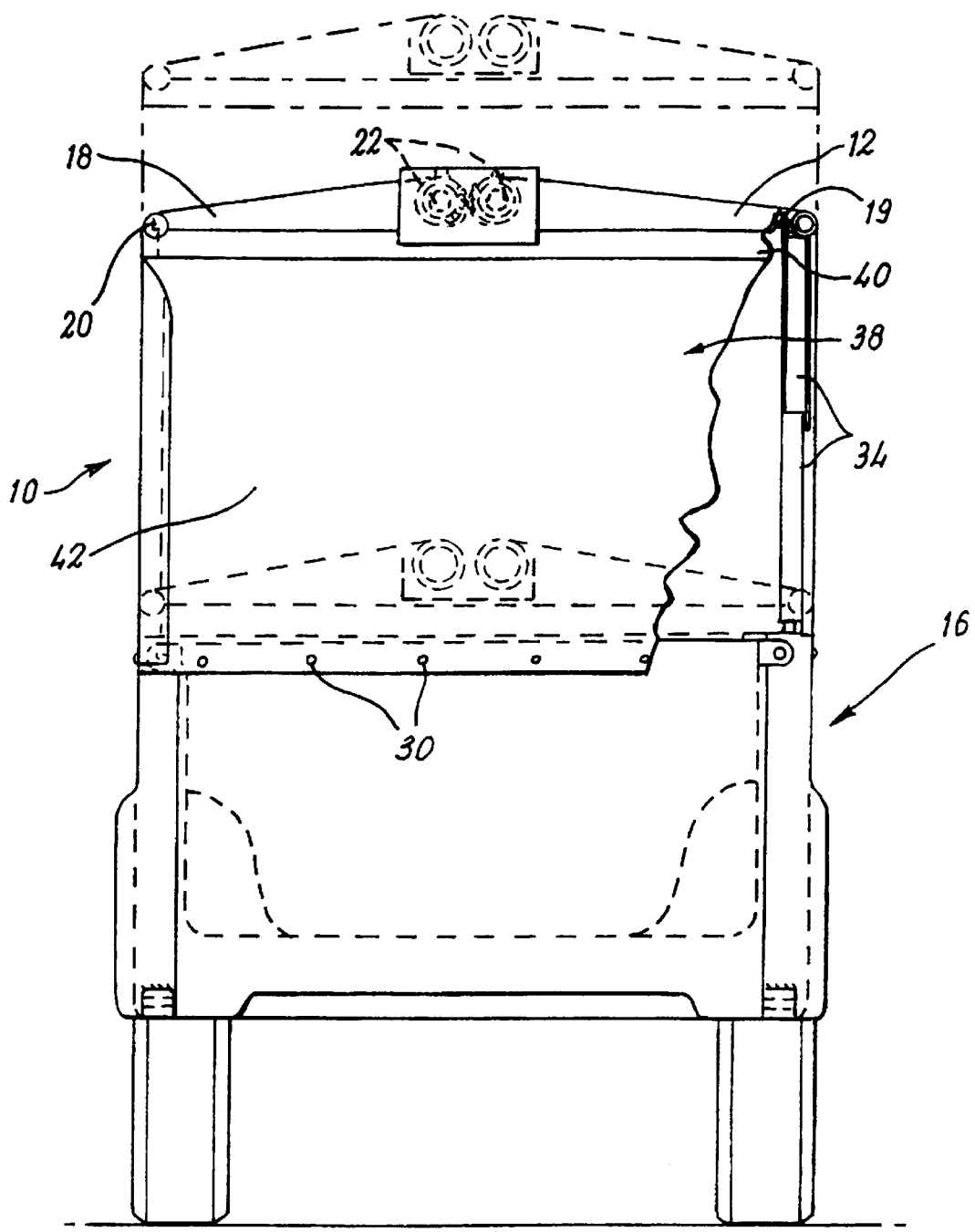
FIG. 2 is a diagrammatic partially cut away end view of the assembly of FIG. 1.

FIGS. 1 to 4 of the drawings show a cover assembly 10 mounted on a pick-up type of vehicle 28 to provide a cover for the rear load carrying area 16. The assembly 10 comprises a frame 12. The frame 12 comprises a length of upwardly open channel section 14 extending longitudinally and centrally of the load carrying area 16. Identical side members 18 extend transversely from either side of the section 14 at each end and substantially midway along its length to connect with respective outwardly facing 'I' section elongate members 19. The lower edge of the members 18 extend substantially horizontally, with the upper edge tapering gently downwardly away from the section 14. A freely rotatable roller 20 extends between each pair of members 18.

A pair of parallel rollers 22 extend side-by-side in the channel section 14. The rollers 22 are interconnected by gearing located in a box 23 at the rear end of the vehicle 28, so as to simultaneously rotate at the same rate but in opposite directions to each other. A respective cover member 24 of flexible sheet material is provided, mounted around each roller 22, extending over the respective rollers 20 and fixed to a fixed member in the form of a respective side wall 26 of the pick-up truck 28 by conventional clips 30.

Profile forming means in the form of spring urging arrangements 32 are provided extending respectively between the frame 12 and each side wall 26. The arrangements 32 each comprise two pairs of pivotted arms 34, with a compressed spring 36 interconnecting the pivotal connections. The arms 34 are arranged to respectively point outwardly, and downwardly or upwardly away from the spring 36.

Further cover arrangements 38 are provided at each end of the frame 12. Each arrangement 38 comprises a sprung roller 40 upon which a further cover member 42 of flexible sheet material is fitted. The free end of the cover member 42 is mountable to the respective end of the load carrying area 16 again by clips 30, and roller 40 urges materials thereonto.

In use, the assembly 10 is fitted on to the load carrying area 16 of the truck 28 as described. If the truck 28 is empty or only carrying a low load, the rollers 22 are activated to wind in a maximum amount of the cover member 24 to provide a low cover as shown in FIG. 1. Winding in of the cover member 24 urges the arrangements 32 to a flat condition by compressing the spring 36. The rollers 40 each automatically wind up nearly all of the respective cover members 42. The rollers 20 can be activated manually with a handle (not shown) or electrically, desirably from within the cab of the truck 28.

When it is desired to raise the assembly 10, to for instance accept a taller load, the rollers 22 are activated to unroll the cover member 24 therefrom. As the cover members 24 are unrolled they move over the respective rollers 20 and the spring 36 automatically urges the frame 12 away from the side walls 26 of the truck, keeping the cover members 24 taught. Raised positions of the assembly 10 are shown in bold outline and dotted outline in FIGS. 2 and 3. If it is required for instance to open the back of the truck 28, the respective cover member 42 can be unclipped therefrom and allowed to roll on to the respective roller 40. An appropriate handle is provided on the rear cover member 42 to permit it to be pulled down against the force of the roller 40 when the truck 28 is again being closed.

The cover arrangements 38 substantially prevent the assembly 10 from swaying when raised. A rigid member 39 (FIG. 2) may be provided along the free end of the cover members 42 to provide for firm mounting thereof on the load carrying area 16. A lock 41 may be provided for selectively locking each of the rollers 40 to further aid stability and prevent swaying during use. A downwardly and rearwardly facing L-section strip 17 may be provided extending upwardly from the front member 18 to provide a seal between the cover member 24 as it extends across the frame 12, and the front cover arrangement 38.

FIG. 4 shows a couple of additional preferred features of the invention. A cover sloping downwardly on either side from an apex may be provided extending above the channel section 14 to prevent water ingress thereinto. Also, a drainage slot may be provided at the base of the section 14 to accept any water, with the slot 46 being open at at least one end to permit water to drain therefrom.

There is thus described a cover assembly for a pick-up truck which can readily be raised and lowered to accept loads of different heights. The assembly 10 is of relatively straightforward construction and can thus be inexpensively and robustly manufactured. The height of the assembly 10 can readily be adjusted, particularly if an electrical drive is provided for the rollers actuable by the vehicle. The cover members are automatically retained in a taught state thereby providing a pleasing visual appearance.

FIGS. 5 and 6 of the drawings show a further cover assembly 50. The assembly 50 is generally similar to the assembly 10 but in this case rollers 52 are provided spaced from each other along the side edges of the frame 12. The rollers 52 are connected by line means in the form of chains 54 to a generally similar gear arrangement 56 to that provided in the assembly 10. Accordingly, the rollers 52 operate in a similar manner to the rollers 22 except that the respective cover members 24 only extend generally vertically downwardly from the rollers 52 to respective side walls of a pick-up truck (not shown). Similar spring urging arrangements 32 (not shown) are again provided on each side of the assembly 50. A fixed pitched roof 58 of flexible sheet material is provided extending over the frame 12. With the assembly 50 the L-section elongate members 60 corresponding to the members 19 face outwardly and downwardly to receive and protect the rollers 52.

Rather than the flexible material roof 58, a roof of rigid material such as rigid plastics material or aluminium could be provided. In FIGS. 5 and 6 the cover members 24 hang from the inner side of the rollers 52, but the members 24 could be wound to hang from the outer side of the rollers 52, as is shown by the broken line 25 in FIG. 6.

Various other modifications may be made without departing from the scope of the invention. For example a different arrangement of rollers could be used. A different arrangement could be used to urge the frame away from the vehicle sides. The cover can be made to any appropriate size and shape. A different number of rollers could be provided along the sides of the frame. In certain instances an arrangement could be provided with only one driven roller.

The frame may be provided as a kit of parts and may be provided with different components and/or components which are adjustable in lengths to enable the assembly to be used with different size vehicles.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A cover assembly comprising two cover members with free ends, the cover members being of flexible sheet material; a roller arrangement to selectively roll up a variable amount of the cover members; and profile forming means provided for each cover member, the profile forming means being engagable with the sheet material to urge same to a taut state; each profile forming means extending from near the free end of the respective cover member; the assembly being arranged such that the cover members can extend to cover an area between two fixed members, with means being provided to locate the two fixed members in a constant spaced relationship, the amount of material extending to cover said area when in use being varied by the roller arrangement, with the profile forming means urging each cover member away from a respective one of the two fixed members to maintain the cover members substantially taut.

2. An assembly according to claim 1, characterised in that means are provided to permit the free end of the cover members to be releasably mountable to fixed members.

3. An assembly according to claim 1, characterised in that the assembly comprises a roller arrangement for each cover member.

4. An assembly according to claim 3, characterised in that the roller arrangements are arranged to dispense the respective cover members in substantially opposite directions.

5. An assembly according to claim 4, characterised in that the roller arrangements are interconnected such that each arrangement simultaneously dispenses or rolls up the respective cover members.

6. An assembly according to claim 5, characterised in that the roller arrangements are located substantially adjacent each other.

7. An assembly according to claim 6, characterised in that the roller arrangements each comprise a roller with the rollers of each arrangement interconnected by gearing so as to rotate at the same rate as each other but in opposite directions.

8. An assembly according to claim 5, characterised in that the roller arrangements are spaced from each other.

9. An assembly according to claim 8, characterised in that the roller arrangements each comprise a roller with the rollers of each arrangement interconnected by line means so as to rotate at the same rate as each other but in opposite directions.

10. An assembly according to claim 9, characterised in that the line means comprise chains.

11. An assembly according to claim 8, characterised in that a fixed size cover extends between the roller arrangements.

12. An assembly according to claim 11, characterised in that the cover is made of flexible sheet material.

13. An assembly according to claim 11, characterised in that the cover is made of a rigid material.

14. An assembly according to claim 1, wherein the assembly comprises a guide member against which guide member the cover member is engagable to provide a required orientation of the guide member, each profile forming means extending between a respective guide member and the or adjacent the free end of the respective cover member, such that the distance between the guide members and the free end of the respective cover member is dependent upon the amount of cover member dispensed by the roller arrangement.

15. An assembly according to claim 14, characterised in that the distance between each respective guide member and roller arrangement is equal and fixed.

16. An assembly according to claim 14, characterised in that the assembly comprises a frame which mounts the guide members and roller arrangements.

17. An assembly according to claim 16, characterised in that the frame comprises a plurality of frame members.

18. An assembly according to claim 17, characterised in that tat least some of the frame members are adjustable in length.

19. An assembly according to claim 14, characterised in that the guide members are located adjacent the respective roller arrangements.

20. An assembly according to claim 14, characterised in that the roller arrangements constitute the guide members.

21. An assembly according to claim 14, characterised in that the cover members extending between the guide members and the roller arrangements extend in use in a generally horizontal alignment.

22. An assembly according to claim 14, characterised in that the cover members extending between the guide members and the roller arrangements slope generally downwardly from the roller arrangements.

23. An assembly according to claim 1, characterised in that a profile forming means is provided for each cover member.

24. An assembly according to claim 23, wherein each profile forming means is sprung outwardly.

25. An assembly according to claim 24, characterised in that each profile means comprises two pairs of pivoted arms, with a compressed spring means extending between each pair of arms to urging the arms to a straight configuration.

26. An assembly according to claim 24, characterised in that the profile forming means extend in a generally vertical plane in use.

27. An assembly according to claim 1, characterised in that further cover members are provided at either end of the assembly.

28. An assembly according to claim 24, characterised in that the further cover members are provided at either end of the assembly, and that further cover members extend between respective ends of the guide members.

29. An assembly according to claim 27, characterised in that the further cover members are mounted on sprung rollers which are urged to roll up the cover members.

30. An assembly according to claim 27, characterised in that each further cover member has a free end, and means are provided permitting each free end to be mounted to a fixed member.

31. A cover assembly for a vehicle the assembly comprising two cover members with free ends, the cover members being of flexible sheet material; a roller arrangement to selectively roll up a variable amount of the cover members; and profile forming means provided for each cover member, the profile forming means being engagable with the sheet material to urge same to a taut state; each profile forming means extending from near free end of the respective cover member; the assembly being arranged such that the cover members can extend to cover an area between two fixed members, with means being provided to locate the two fixed members in a constant spaced relationship, the amount of material extending to cover said area being varied by the roller arrangement, with the profile forming meas urging each cover member away from a respective one of the two fixed members to maintain the cover members substantially taut.

32. A cover assembly according to claim 31, characterised in that the assembly comprises a roller arrangement for each cover member.

33. A pick-up truck incorporating a cover assembly, the assembly comprising two cover members with free ends, the cover members being of flexible sheet material; a roller arrangement to selectively roll up a variable amount of the cover members; and profile forming means provided for each cover member, the profile forming means being engagable with the sheet material to urge same to a taut state; each profile forming means extending from near the free end of the respective cover member; the assembly being arranged such that the cover members can extend to cover an area between two fixed members, with means being provided to locate the two fixed members in a constant spaced relationship, the amount of material extending to cover said area being varied by the roller arrangement, with the profile forming means urging each cover member away from a respective one of the two fixed members to maintain the cover members substantially taut.

34. A pick-up truck according to claim 33, characterised in that the assembly comprises a roller arrangement for each cover member.

35. A cover assembly comprising a spaced pair of cover members of flexible sheet material; a pair of roller arrangements to selectively roll up a variable amount of the cover members; and profile forming means engagable with the cover members; the assembly being arranged such that the cover members selectively extend between two fixed members, and the amount of material extending therebetween is varied during use by the roller arrangements, with the profile forming means urging the cover member away from fixed members to maintain the cover member substantially taut; and in a fixed size cover extends between the roller arrangements.

36. An assembly (50) according to claim 35, characterised in that the cover (58) is made of flexible sheet material.

37. An assembly (50) according to claim 35, characterised in that the cover (58) is made of rigid material.

* * * * *